United States Patent
McGee et al.

(10) Patent No.: US 8,207,265 B2
(45) Date of Patent: Jun. 26, 2012

(54) ADHESIVES FILMS

(75) Inventors: Robert L. McGee, Midland, MI (US); Julie R. Hatlewick, Saginaw, MI (US)

(73) Assignee: Dow Global Technologies LLC, Midland, MI (US)

( * ) Notice: Subject to any disclaimer, the term of this patent is extended or adjusted under 35 U.S.C. 154(b) by 455 days.

(21) Appl. No.: 12/444,313

(22) PCT Filed: Oct. 16, 2007

(86) PCT No.: PCT/US2007/022039
§ 371 (c)(1), (2), (4) Date: Apr. 3, 2009

(87) PCT Pub. No.: WO2008/054637
PCT Pub. Date: May 8, 2008

(65) Prior Publication Data
US 2010/0098935 A1 Apr. 22, 2010

Related U.S. Application Data

(60) Provisional application No. 60/855,276, filed on Oct. 30, 2006.

(51) Int. Cl.
| C08B 15/08 | (2006.01) |
| C08L 23/04 | (2006.01) |
| C08L 37/00 | (2006.01) |
| C08L 53/00 | (2006.01) |
| C09J 151/06 | (2006.01) |
| C09J 123/06 | (2006.01) |

(52) U.S. Cl. ............................................. 525/71; 525/74
(58) Field of Classification Search ..................... 525/71, 525/74
See application file for complete search history.

(56) References Cited

U.S. PATENT DOCUMENTS

| 4,212,405 A | | 7/1980 | Schmidt | |
| 4,940,279 A | | 7/1990 | Abott et al. | |
| 5,026,798 A | | 6/1991 | Canich | |
| 5,080,950 A | | 1/1992 | Burke | |
| 5,132,380 A | | 7/1992 | Stevens et al. | |
| 5,631,069 A | * | 5/1997 | Wooster et al. | 428/220 |
| 5,643,997 A | | 7/1997 | Matsuoka et al. | |
| 5,703,187 A | | 12/1997 | Timmers | |
| 5,910,358 A | * | 6/1999 | Thoen et al. | 428/316.6 |
| 6,013,819 A | | 1/2000 | Stevens et al. | |
| 6,187,424 B1 | * | 2/2001 | Kjellqvist et al. | 428/220 |
| 6,395,671 B2 | | 5/2002 | LaPointe | |
| 6,866,329 B2 | | 3/2005 | Clifford | |
| 6,953,764 B2 | | 10/2005 | Frazier et al. | |
| 2003/0204017 A1 | | 10/2003 | Stevens et al. | |
| 2005/0074309 A1 | | 4/2005 | Ehrlich | |
| 2006/0199930 A1 | | 9/2006 | Li Pi Shan et al. | |
| 2007/0054142 A1 | * | 3/2007 | Lee et al. | 428/522 |
| 2011/0086970 A1 | * | 4/2011 | Grein et al. | 524/528 |

FOREIGN PATENT DOCUMENTS

| EP | 0 514 548 A1 | 5/1992 |
| EP | 1 298 168 A1 | 4/2003 |
| WO | WO 97/27259 | 7/1997 |
| WO | WO 03/040195 | 5/2003 |
| WO | WO 2004/024740 | 3/2004 |
| WO | WO2005-090427 | 9/2005 |

OTHER PUBLICATIONS

E. A. Turi, ed., *Thermal Characterization of Polymeric Materials*, Academic Press, 1981, pp. 46-67.
Rev. Macromol. Chem. Phys., C29 (2&3), pp. 275-287, (1989).
Sperling, L. H., Introduction to Physical Polymer Science 1986 pp. 44-49.
Whelan, Tony, David Dunning. *The Dynisco Extrusion Processor Handbook*, 1st Ed. 1996, pp. 46-70.

* cited by examiner

*Primary Examiner* — Jeffrey Mullis

(57) ABSTRACT

This invention comprises a film useful as an adhesive, a composition useful to make the film, and a laminate comprising the film contiguous with at least one metal substrate, at least one foam substrate or combination thereof. The composition comprises (a) at least one anhydride grafted olefin polymer, (b) at least one high density polyethylene, and (c) at least one elastomer which preferably has a tensile elongation at break of at least about 585%, a density of at most about 0.900 g/cm$^3$ or a combination thereof. The anhydride grafted olefin polymer or combination thereof is preferably present in an amount of from about 20 to about 40 weight percent, the high density polyethylene or combination thereof is preferably present in an amount of from about 40 to about 60 weight percent, and the elastomer or combination thereof is preferably present in an amount of from about 17 to about 30 weight percent. Each anhydride grafted olefin polymer is independently most preferably a maleic anhydride grafted high density polyethylene. The high density polyethylene preferably has a melt index at most about 30 dg/min. The elastomer is preferably a substantially linear ethylene polymer or olefin block copolymer.

15 Claims, No Drawings

ADHESIVES FILMS

This application claims benefit of priority from U.S. Provisional Application Ser. No. 60/855,276, filed on Oct. 30, 2006.

BACKGROUND

The invention relates to film compositions, particularly to film compositions having adhesive properties.

There are many films useful to join articles of dissimilar composition. Some of them are useful to adhere to metals, even to adhere polymers to metals. However, the ones suitable for adhering metal to polymers, preferably polymeric foams are limited in their temperature resistance. For instance, adhesive films presently used to adhere foam to metal often fail at temperatures of about 130° C. or higher. Higher temperatures are encountered, for instance, in steam cleaning operations.

It would, therefore, be desirable to have an adhesive film that would maintain a bond between a metal sheet and a polymeric foam at a temperature greater than about 130° C., advantageously at least about 135° C., more advantageously at least about 140° C., most advantageously at least about 145° C., preferably at least about 150° C., more preferably at least about 155° C., most preferably at least about 160° C. as determined by a hanging failure temperature test. The latter corresponds to at least about 140° C. when tested with a weight of 0.45 kg in a hanging weight failure temperature test.

SUMMARY OF THE INVENTION

This invention comprises a film useful as an adhesive, a composition useful to make the film, and a laminate comprising the film, preferably contiguous with at least one metal substrate, at least one foam substrate or combination thereof. The composition comprises (a) at least one anhydride grafted olefin polymer, (b) at least one high density polyethylene, and (c) at least one elastomer, preferably having a tensile elongation at break of at least about 585%, a density of at most about 0.900 g/cm$^3$ or a combination thereof. The anhydride grafted olefin polymer or combination thereof is preferably present in an amount of from about 20 to about 40 weight percent, the high density polyethylene or combination thereof is preferably present in an amount of from about 40 to about 60 weight percent, and the elastomer or combination thereof is preferably present in an amount of from about 17 to about 30 weight percent. Each anhydride grafted olefin polymer is independently most preferably a maleic anhydride grafted high density polyethylene. The high density polyethylene preferably has a melt index at most about 30 dg/min. The elastomer is preferably a substantially linear ethylene polymer or olefin block copolymer.

The invention includes a process of preparing a film composition comprising steps of (a) supplying a first component, at least one maleic anhydride graft olefin polymer, (b) supplying a second component, at least one HDPE, (c) supplying third component, at least one elastomer, preferably having a tensile elongation at break of at least about 585%, a density of at most about 0.900 g/cm$^3$ or a combination thereof; and, (d) admixing the first, second and third components and optional additives.

The invention additionally comprises a process of preparing a film comprising steps of (a) supplying a first component, at least one maleic anhydride graft olefin polymer, (b) supplying a second component, at least one HDPE, (c) supplying third component, at least one elastomer, preferably having a tensile elongation at break of at least about 585%, a density of at most about 0.900 g/cm$^3$ or a combination thereof; (d) admixing the first, second and third components and optional additives; and, (e) casting the resulting admixture into a film.

Moreover, the invention includes a process of making a laminate comprising steps of (a) supplying a film comprising at least one maleic anhydride grafted polyethylene, at least one HDPE and at least one elastomer; (b) positioning a layer of the film directly adjacent to at least one layer metal on one side and directly adjacent to a polymer foam on the other (b) applying sufficient heat or other energy to result in softening of the film with simultaneous application of sufficient pressure to press polymer into intimate contact with metal and foam.

BRIEF DESCRIPTION OF THE DRAWINGS

There are no drawings.

DETAILED DESCRIPTION OF THE INVENTION

Definitions:

The term "haze" as used herein refers to the scattering of light by a specimen responsible for the deduction of contrast of objects viewed through it. Percent of transmitted light that is scattered so that its direction deviates more than a specified angle from the direction of the incident beam. The specified angle in ASTM D 1003 is 0.044 radians or 2.5 degrees.

The term "modulus" as used herein refers to the stiffness and ability to resist stretching. As used herein modulus refers to Secant modulus, preferably at 1 percent elongation. Secant modulus can be used to predict the elongation or compression of an object as long as the stress is less than the yield strength of the material. Modulus is usually expressed as the ratio of stress exerted on the sample to the amount of deformation (typically 1% or 2% elongation). Secant modulus is measured according to the procedures of ASTM D 882-97.

The term "toughness" as used herein refers to the energy or the area under the stress/strain curve required to break a sample of film during a standard tensile test as measured according to the procedures of ASTM D-882.

The term "stress at yield" as used herein refers to the lowest force per unit area at which extension of the tensile test piece, that is a strip of film about 1 inch (2.5 cm) wide and about 8 inches (20 cm) long (or cut according to the specifications of the standard procedure) increases without an increase in the load and is measured according to the procedures of ASTM D-882.

The term "strain at yield" as used herein refers to the percent change in length of a tensile test piece at which extension increases without an increase in the load and is measured according to the procedures of ASTM D-882.

The term "tensile elongation at break" as used herein refers'to the percent change in length of a tensile test piece until breakage as determined in accordance with the procedures of ASTM D-882.

Differential scanning calorimetry (DSC) is a common technique that can be used to examine the melting and crystallization of semi-crystalline polymers. General principles of DSC measurements and applications of DSC to studying semi-crystalline polymers are described in standard texts (for instance, E. A. Turi, ed., *Thermal Characterization of Polymeric Materials,* Academic Press, 1981).

"Density" refers to the mass per unit volume of a substance as determined by ASTM D-2839 or D-1505.

The term "hanging weight failure temperature" as used herein refers to the temperature in degrees C. at which a laminated structure consisting of a primed coated metal plate, high density polyethylene foam substrate and the film sample is seen to delaminate at the film interface between the metal and foam. The laminate is prepared by cutting the individual pieces of metal, foam, and film and layering them together with the film in the center. The resulting sandwiched structure is heated within a window frame mold in a hot press at a temperature hot enough to melt the film but not hot enough to collapse the foam. The laminate is cooled to room temperature. The resulting 0.6 cm thick laminated structure is cut into 2.54 cm wide samples with a length of 15 cm. A notch is cut into the laminate between one metal side and the foam and a 2.54 cm end is bent down into an "L" shape. A hole is drilled through the metal and a 0.45 Kg weight is hung on wire from the metal side. The samples are attached to a wire rack by wire and the samples are, thus, hung into an oven. The temperature within the oven is allowed to equilibrate at 120° C. for 15 minutes. The temperature is then raised step wise at 5° C. increments, each allowed to equilibrate. After equilibration, the oven door is opened for sample monitoring to observe delamination failure at the foam metal interface. The temperature where such failure is first observed is recorded.

The term "peel strength" as used herein refers to the force in N required to pull apart a laminated sample. A typical force curve will have a maximum value at the initiation of the peel and a lower average' force thereafter. Results are reported as maximum force and average force. In testing laminates of the invention, a laminate is prepared by cutting the individual pieces of metal, foam, and film and layering them together with the film in the center. The resulting sandwiched structure is heated within a window frame mold in a hot press at a temperature hot enough to melt the film but not hot enough to collapse the foam. The laminate is cooled back to room temperature. The resulting 0.6 cm thick laminated structure is cut into 2.54 cm wide samples with a length of 15 cm. A notch is cut into the laminate between one metal side and the foam and a 2.54 cm end is bent down into an "L" shape. Peel is then tested on each 2.54 cm wide sample at 25.4 cm/min rate with a 10.16 cm jaw separation in an universal testing machine commercially available from Instron Corporation under the trade designation Instron Universal Testing Machine.

"Molecular weight" is the weight average molecular weight. Molecular weight and molecular weight distributions of polymers are determined using gel permeation chromatography (GPC) on a Polymer Laboratories PL-GPC-220 high temperature chromatographic unit equipped with four linear mixed bed columns (Polymer Laboratories (20-micron particle size)). The oven temperature is at 160° C. with the autosampler hot zone at 160° C. and the warm zone at 145° C. The solvent is 1,2,4-trichlorobenzene containing 200 ppm 2,6-di-t-butyl-4-methylphenol. The flow rate is 1.0 milliliter/minute and the injection size is 100 microliters. About 0.2% by weight solutions of the samples are prepared for injection by dissolving the sample in nitrogen purged 1,2,4-trichlorobenzene containing 200 ppm 2,6-di-t-butyl-4-methylphenol for 2.5 hrs at 160° C. with gentle mixing.

Number average molecular weight (Mn) is a measure of average chain length based on monomer repeat units per chain and is calculated from the molecular weight distribution curve measured by gel permeation chromatography.

Weight average molecular weight (Mw) is a measure of average chain length based on a weighted average and is calculated from the molecular weight distribution curve measured by gel permeation chromatography.

Molecular weight distribution (MWD) or polydispersity is Mw/Mn and is a measure of the similarity of molecular weights in a sample of polymer. Polymers made using metallocene catalysts commonly have MWD less than about 5, advantageously less than about 4; more advantageously less than about 3.5, preferably less than about 3, more preferably less than about 2.5, most preferably less than about 2.

The terms "melt flow rate" and "melt index" are, used herein to mean the amount, in grams, of a thermoplastic resin which is forced through an orifice of specified length and diameter in ten minutes under prescribed conditions in accordance with ASTM D 1238. In the case of propylene polymers, the conditions are 230° C./2.16 Kg unless stated otherwise. In the case of ethylene polymers, the conditions are 190° C./2.16 Kg unless stated otherwise.

The term "thermoplastic polymer" as used herein, refers to polymers, both crystalline and non-crystalline, which are melt processable under ordinary melt processing conditions and does not include polymers such as polytetrafluoroethylene which under extreme conditions, may be thermoplastic and melt processable.

"Mer unit" means that portion of a polymer derived from a single reactant molecule; for example, a mer unit from ethylene has the general formula —$CH_2CH_2$—.

The term "olefin polymer" or "polyolefin" means a thermoplastic polymer derived from one or more olefins. Representative olefins include ethylene, propylene, 1-butene, 1-hexene, 1-octene, 4-methyl-1-pentene, butadiene, cyclohexene, dicyclopentadiene, styrene, toluene, α-methylstyrene and the like. Aliphatic monounsaturated olefins are preferred and have the general formula $C_nH_{2n}$, such as ethylene, propylene, and butene. The polyolefin can bear one or more substituents, for instance, a functional group such as a carbonyl, sulfide, and the like, but is preferably a hydrocarbon. In a polyolefin some mer units are derived from an olefinic monomer which can be linear, branched, cyclic, aliphatic, aromatic, substituted, or unsubstituted (for instance, olefin homopolymers, copolymers of two or more olefins, copolymers of an olefin and a non-olefinic comonomer such as a vinyl monomer, and the like). The term refers preferably to polymers and copolymers of ethylene or propylene or a combination thereof, including their copolymers with functionally substituted comonomers such as ethylene vinyl acetate copolymer and ionomer, most preferably to the hydrocarbon polymers and copolymers. Polyolefins can be linear, branched, cyclic, aliphatic, aromatic, substituted, or unsubstituted. Included in the term polyolefin are homopolymers of an olefin, copolymers of olefins, copolymers of an olefin and a non-olefinic comonomer copolymerizable with the olefin, such as vinyl monomers, modified polymers of the foregoing, and the like. Modified polyolefins include modified polymers prepared by copolymerizing the homopolymer of the olefin or copolymer thereof with an unsaturated carboxylic acid, for instance, maleic acid, fumaric acid or the like, or a derivative thereof such as the anhydride, ester metal salt or the like. They also include polyolefins obtained by incorporating into the olefin homopolymer or copolymer, an unsaturated carboxylic acid, for instance, maleic acid, fumaric acid or the like, or a derivative thereof such as the anhydride, ester metal salt or the like.

"Polypropylene" or "propylene polymer" means a polymer having at least half of its mer units derived from propylene. These include homopolymers of propylene as well as copolymers of propylene with one or more monomers copolymerizable therewith such as ethylene, butylene, pentene, hexene, heptene, octene, optionally including derivatives of such monomers and combinations thereof.

Random copolymer means a polymer having a random distribution of comonomer in a majority polymer, especially comonomer in propylene polymer, as contrasted with arrangements like block copolymers and impact copolymers. It is understood that complete statistical randomness may not occur and that there may be variation from one polymer molecule to the next within a polymer composition or polymer product.

The term "polyethylene" means a homopolymer of ethylene or an ethylene/alpha-olefin copolymer having a majority of its mer units derived from ethylene.

The term "ethylene/alpha-olefin copolymer" designates copolymers of ethylene with one or more comonomers selected from $C_3$ to $C_{20}$ alpha-olefins, such as 1-butene, 1-pentene, 1-hexene, 1-octene, methyl pentene and the like. Included are polymer molecules comprising long chains with relatively few side chain branches obtained by low pressure polymerization processes and the side branching that is present is short compared to non-linear polyethylenes (for instance, LDPE, a low density polyethylene homopolymer). Ethylene/alpha-olefin copolymers generally have a density in the range of from about 0.86 g/cc to about 0.94 g/cc. The term linear low density polyethylene (LLDPE) is generally understood to include that group of ethylene/alpha-olefin copolymers which fall into the density range of about 0.915 to about 0.94 g/cc or 0.930 when linear polyethylene in the density range from about 0.926 to about 0.95 is referred to as linear medium density polyethylene (LMDPE). Lower density ethylene/alpha-olefin copolymers maybe referred to as very low density polyethylene (VLDPE), often used to refer to the ethylene/butene copolymers available from Union Carbide Corporation with a density ranging from about 0.88 to about 0.915 g/cc) and ultra-low density polyethylene (ULDPE), typically used to refer to certain ethylene/octene copolymers supplied by the Dow Chemical Company. Ethylene/alpha-olefin copolymers are the preferred polyolefins in the practice of the invention.

The term "substantially linear" means that, in addition to the short chain branches attributable to homogeneous comonomer incorporation, an ethylene polymer is further characterized as having long chain branches in that the polymer backbone is substituted with an average of 0.01 to 3 long chain branches/1000 carbons. Preferred substantially linear polymers for use in the invention are substituted with from 0.01 long chain branch/1000 carbons to 1 long chain branch/1000 carbons, and more preferably from 0.05 long chain branch/1000 carbons to 1 long chain branch/1000 carbons.

The substantially linear ethylene/α-olefin polymers are made by a continuous process using suitable constrained geometry catalysts, preferably constrained geometry catalysts as disclosed in U.S. Pat. Nos. 5,132,380, 5,703,187; and 6,013,819, the teachings of all of which are incorporated herein by reference. The monocyclopentadienyl transition metal olefin polymerization catalysts taught in U.S. Pat. No. 5,026,798, the teachings of which are incorporated herein by reference, and are also suitable for use in preparing the polymers of the present invention.

Long chain branching is defined herein as a branch having a chain length greater than that of any short chain branches which are a result of comonomer incorporation. The long chain branch can be as long as about the same length as, the length of the polymer back-bone. Long chain branching can be determined using methods within the skill in the art, for instance by using $^{13}C$ nuclear magnetic resonance (NMR) spectroscopy measurements, with quantification using, for instance, the method of Randall (Rev. Macromol. Chem. Phys., C29 (2&3), p. 275-287).

For the substantially linear ethylene/α-olefin polymers used in the practice of the invention, the $I_{10}/I_2$ ratio indicates the degree of long chain branching, that is, the higher the $I_{10}/I_2$ ratio, the more long chain branching in the polymer. Generally, the $I_{10}/I_2$ ratio of the substantially linear ethylene/α-olefin polymers is at least about 5.63, preferably at least about 7, especially at least about 8 or above, and as high as about 25. The melt index of a substantially linear ethylene polymer is measured according to ASTM D-1238 condition 190° C./2.16 Kg (formerly known as Condition E).

LLDPE is an abbreviation for linear low density polyethylene and refers to copolymers of ethylene having: (1) a higher-alpha-olefin such as butene, octene, hexene, etc. as a comonomer; (2) a density of from about 0.915 to as high as about 0.930 grams per cubic centimeter (cc or $cm^3$); (3) molecules comprising long chains with few or no branches or cross-linked structures; and, (4) being produced at low to medium pressures by copolymerization using heterogeneous catalysts based on transition metal compounds of variable valance.

LDPE is an abbreviation for low density polyethylene and designates polyethylene having a density from about 0.910 to 0.940 $g/cm^3$ produced in radical polymerization reactions under high pressure such that branching occurs and non-linear polyethylene is formed.

MDPE is an abbreviation for Medium density polyethylene and designates polyethylene having a density from about 0.930 to 0.950 $g/cm^3$.

HDPE is an abbreviation for High density polyethylene and designates polyethylene having a density from about 0.950 usually to about 0.965 $g/cm^3$.

As used herein, the term "graft copolymer" means a copolymer produced by the combination of two or more chains of constitutionally or configurationally different features, one of which serves as a backbone main chain, and at least one of which is bonded at some point(s) along the backbone and constitutes a side chain. Thus, graft copolymers can be described as polymers having pendant polymeric side chains, and as being formed from the "grafting" or incorporation of polymeric side chains onto or into a polymer. The polymer to which the grafts are incorporated can be homopolymers or copolymers. The graft copolymers are derived from a variety of monomer units.

The term "grafted" means a copolymer has been created which comprises side chains or species bonded at some point(s) along the backbone of a parent polymer.

As used herein, the term "grafting" means the forming of a polymer by the bonding of side chains or species at some point(s) along the backbone of a parent polymer. Such processes are well within the skill in the art such as disclosed by Sperling, L. H., Introduction to Physical Polymer Science 1986 pp. 44-47.

The term "graft copolymerization" is used herein, unless otherwise indicated, to mean a process involving formation of an active site or sites at one or more points on the main chain of a polymer molecule other than its end and exposure to at least one other monomer or oligomer which becomes incorporated or attached at one or more such active sites. An attached monomer preferably begins a side chain.

The term "elastomer" is used herein to refer to a polymer which exhibits tensile elongation at break of advantageously at least about 200, preferably at least about 220, more preferably at least about 240, most preferably at least about 260 and preferably at most about 2000, more preferably at most about 1700, and, in some embodiments, most preferably at most about 1500 percent as measured by the procedures of ASTM D-412 and/or D-882.

"Film" refers to a sheet, non-woven or woven web or the like or combinations thereof, having length and breadth dimensions and having two major surfaces with a thickness therebetween. A film can be a monolayer film (having only one layer) or a multilayer film (having two or more layers). A multilayer film is composed of more than one layer preferably composed of at least two different compositions, advantageously extending substantially the length and breadth dimensions of the film. Layers of a multilayer film are usually bonded together by one or more of the following methods: coextrusion, extrusion coating, vapor deposition coating, solvent coating, emulsion coating, or suspension coating. A film, in most instances, has a thickness of up to about 20 mils ($5 \times 10^{-4}$ m); although common use of the term sometimes refers to material as film when a thickness is less than 10 mils (2.5×10-4 m) and as a sheet when the thickness is greater.

The term "sheet" as used herein means a material having two substantially parallel planar surfaces of much larger dimensions than its third dimension, or thickness, but somewhat thicker or stiffer than a film, for instance a material having a thickness greater than about 10 mils (2.5×10-4 m) up to about 100 mm or greater.

"Layer" means herein a member or component forming all or a fraction of the thickness of a structure wherein the component is preferably substantially coextensive with the structure and has a substantially uniform composition.

The term "monolayer film" as used herein means a film having substantially one layer. Optionally, however, more than one ply of monolayer film is used in an application with or without one or more adhesives between adjacent plies. Thus, a film is considered monolayer if it is formed in a process considered in the art to be a monolayer process, for instance, formed by a double bubble process rather than a coextrusion process, even if two layers of a composition according to the practice of the invention are used adjacent to one another or even with an adhesive between the layers.

The term "multilayer film" means a film having two or more layers. A multilayer film is composed of more than one layer preferably composed of at least two different compositions, advantageously extending substantially the length and breadth dimensions of the film. Layers of a multilayer film are usually bonded together by one or more of the following methods: coextrusion, extrusion coating, vapor deposition coating, solvent coating, emulsion coating, or suspension coating. A film, in most instances, has a thickness of up to about 30-35 mils ($7.5\text{-}8 \times 10^{-4}$ m).

As used herein "contiguous" or "directly adjacent," when referring to two layers, is intended to refer to two layers that are directly adhered one to the other. In contrast, as used herein, the word "between", as applied to a film layer expressed as being between two other specified layers, includes both direct adherence of the subject layer to the two other layers it is between, as well as lack of direct adherence to either or both of the two other layers the subject layer is between, that is, one or more additional layers can be imposed between the subject layer and one or more of the layers the subject layer is between.

"Laminate" refers to a material made up of two or more layers of material bonded or adhered together, and includes a multilayer film, such as a coextruded film.

The term "foam" as used herein means a solid material, throughout which are distributed voids, pores or cells, which are advantageously at least partially open and function to interconnect the voids throughout the material. Foam materials may be produced from a polymerization mixture containing gas-generating agents or through which gas is pumped during the polymer solidification process. As used herein, the term "foam" shall include open and closed celled material, blown, molded or otherwise formed, including synthetic or natural foams, preferably polymer foams. As used herein, a "polymer foam" refers to an article that includes a polymer matrix in which the density of the article is less than the density of the polymer matrix alone.

The term "foam layer" as used herein should be understood broadly to mean any layer with pockets or cells of air or gas. Such layers preferably insulate against conductive heat transfer between materials directly adjacent each surface of the foam. Such foam layers preferably provide a degree of compressibility to allow the multi-layer article of which the foam layer is a part to be at least somewhat flexible or compressible, for instance to resist damage from blows or irregularities in adjacent materials.

"Extrusion," and "extrude," refer to the process of forming continuous shapes by forcing a molten plastic material through a die, followed by cooling or chemical hardening. Immediately prior to extrusion through the die, the relatively high-viscosity polymeric material is fed into a rotating screw, which forces it through the die.

"Coextrusion," and "coextrude," refer to the process of extruding two or more materials through a single die with two or more orifices arranged so that the extrudates merge and weld together into a laminar structure before cooling or chilling, that is, quenching. Coextrusion is often employed as an aspect of other processes, for instance, in film blowing, casting film, and extrusion coating processes.

"Blown film" or "film blowing" refers to a process for making a film in which a thermoplastic polymer or co-polymer is extruded to form a bubble filled with heated air or another hot gas in order to stretch the polymer. Then, the bubble is collapsed and collected in flat film form.

The term "machine direction" (MD) is the direction that a film travels through machinery used during its production, for instance as it passes from being blown or cast to being cut and rolled. The term "transverse direction" (TD) is used for the direction perpendicular or transverse to MD, in the plane of the film.

The term "surface texture" refers to patterns that are induced to form on the surface of the polymer film. These can be induced to form by several methods, including melt fracture at the polymer surface during extrusion or by embossing the heated film as it emerges from the die with a patterning substrate. Surface texture can be useful, for instance, to reduce air trapped as laminates are formed.

The terms "admixing", "mixing" and "mixtures" are used synonymously herein with such terms as "interblending", "blending", and "blend" and are intended to refer to any process that reduces non-uniformity of a composition that is formed of two or more constituents. This is an important step in polymer processing because mechanical, physical and chemical properties as well as product appearance generally are dependent upon the uniformity of the composition of a product. Accordingly, "mixture" or "admixture" as result of a mixing step is defined herein as the state formed by a composition of two or more ingredients which may, but need not, bear a fixed proportion to one another and which, however commingled, may, but need not be, conceived as retaining a separate existence. Generally, a mixing step according to the invention is an operation which is intended to reduce non-uniformity of a mixture.

All percentages, preferred amounts or measurements, ranges and endpoints thereof herein are inclusive, that is, "less than about 10" includes about 10. "At least" is, thus, equivalent to "greater than or equal to," and "at most' is, thus, equivalent "to less than or equal to." Numbers herein have no more precision than stated. Thus, "105" includes at least from 104.5 to 105.49. Furthermore, all lists are inclusive of combinations of any two or more members of the list. All ranges from a parameters described as "at least," "greater than,"

"greater than or equal to" or similarly, to a parameter described as "at most," "up to," "less than," "less than or equal to" or similarly are preferred ranges regardless of the relative degree of preference indicated for each parameter. For instance, a range that has an advantageous lower limit combined with a most preferred upper limit is preferred for the practice of this invention. All amounts, ratios, proportions and other measurements are by weight unless stated otherwise. All percentages refer to weight percent based on total composition according to the practice of the invention unless stated otherwise. Unless stated otherwise or recognized by those skilled in the art as otherwise impossible, steps of processes described herein are optionally carried out in sequences different from the sequence in which the steps are discussed herein. Furthermore, steps optionally occur separately, simultaneously or with overlap in timing. For instance, such steps as heating and admixing are often separate, simultaneous, or partially overlapping in time in the art. Unless stated otherwise, when an element, material, or step capable of causing undesirable effects is present in amounts or in a form such that it does not cause the effect to an unacceptable degree it is considered substantially absent for the practice of this invention. Furthermore, the terms "unacceptable" and "unacceptably" are used to refer to deviation from that which can be commercially useful, otherwise useful in a given situation, or outside predetermined limits, which limits vary with specific situations and applications and may be set by predetermination, such as performance specifications. Those skilled in the art recognize that acceptable limits vary with equipment, conditions, applications, and other variables but can be determined without undue experimentation in each situation where they are applicable. In some instances, variation or deviation in one parameter may be acceptable to achieve another desirable end.

The term "comprising", is synonymous with "including," "containing," or "characterized by," is inclusive or open-ended and does not exclude additional, unrecited elements, material, or steps. The term "consisting essentially of" indicates that in addition to specified elements, materials, or steps; elements, unrecited materials or steps may be present in amounts that do not unacceptably materially affect at least one basic and novel characteristic of the subject matter. The term "consisting of" indicates that only stated elements, materials or steps are present.

Invention

This invention comprises a film useful as an adhesive, a composition useful to make the film, and a laminate comprising the film, preferably contiguous with at least one metal substrate, at least one foam substrate or combination thereof. The composition comprises (a) at least one anhydride grafted olefin polymer, (b) at least one high density polyethylene, and (c) at least one elastomer.

The first component of the composition used to make the film, which can function as an adhesive layer, is at least one anhydride grafted olefin polymer, preferably a maleic anhydride grafted (MAH-g-) olefin polymer. The olefin polymer is preferably MAH-g-ethylene polymer, more preferably a MAH-g-HDPE, for example, the MAH grafted polymer commercially available from Equistar Chemicals, LP under the trade designation PLEXAR™ PX2220, or the MAH grafted polymer commercially available from The Dow Chemical Company under the trade designation AMPLIFY™ GR205 or AMPLIFY™ GR204. Preferred MAH-g-olefin polymers have a melting point, determined by Differential Scanning Calorimetry (DSC), of preferably at least about 125 degrees centigrade (° C.), more preferably at least about 128° C., most preferably at least about 130° C. The melting point of each anhydride grafted ethylene polymer in the adhesive film is preferably at most about 135° C., more preferably at most about 134° C., and most preferably at most about 133° C. The melt index as determined by the procedures of ASTM D1238, condition 190° C/2.16 Kg, is preferably at least about 2, more preferably at least about 2.5, most preferably at least about 3 and advantageously at most about 30, preferably at most about 25, more preferably at most about 20, most preferably at most about 15 dg/min. Graft content is preferably at least about 0.5, more preferably at least about 0.75 most preferably at least about 1 and advantageously at most about 3, preferably at most about 2.8, more preferably at most about 2.5, most preferably at most about 2 weight percent.

The grafted olefin polymer is present in an amount of preferably at least about 20, more preferably at least about 24, most preferably at least about 28 and preferably at most about 40, more preferably at most about 36, most preferably at most about 32 weight percent based on total weight of polymers in the film composition.

The second component of the composition used to make the film is a high density polyethylene (HDPE), that is an ethylene polymer having a density of at least about 0.950 g/cm$^3$ and usually at most about 0.965 g/cm$^3$. HDPE is commercially available, for instance from The Dow Chemical Company under the trade designation DMDA-8907 NT7 HDPE or from Equistar Chemicals, LP under the trade designations ALATHON™ 6060 HDPE and ALATHON™ 6030 HDPE. Preferred HDPE resins have a melting point, determined by Differential Scanning Calorimetry (DSC), of preferably at least about 125° C., more preferably at least about 127° C., most preferably at least about 129° C., preferably at most about 135° C., more preferably at most about 134° C., and most preferably at most about 133° C. The melt index as determined by the procedures of ASTM D1238, condition 190° C./2.16 kg, is preferably at least about 2, more preferably at least about 2.5, most preferably at least about 3 and advantageously at most about 30 preferably at most about 25, more preferably at most about 20, most preferably at most about 15 dg/min.

The HDPE is present in an amount of preferably at least about 40, more preferably at least about 44, most preferably at least about 46 and preferably at most about 60, more preferably at most about 56, most preferably at most about 54 weight percent based on total weight of polymers in the film composition.

The third component of the composition used to make the film is an elastomer having a tensile elongation at break as measured by the procedures of ASTM D882 of advantageously at least about 585, more advantageously at least about 600, most advantageously at least about 700, preferably at least about 750, more preferably at least about 800, most preferably at least about 900%. The elastomer advantageously has a density of at most about 0.900 g/cm$^3$, preferably at most about 0.895, more preferably at most about 0.890, most preferably at most about 0.885 g/cm$^3$. Preferred elastomers include substantially linear ethylene polymers, and certain ethylene/alpha olefin block copolymers, referred to hereinafter as "olefin block copolymers." The ethylene/alpha olefin block copolymer preferably:

(a) has a Mw/Mn from about 1.7 to about 3.5, at least one melting point, Tm, in degrees Celsius, and a density, d, in grams/cubic centimeter, wherein the numerical values of Tm and d correspond to the relationship:

$$Tm > -2002.9 + 4538.5(d) - 2422.2(d)2; \text{ or}$$

(b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$$\Delta T > -0.1299(\Delta H) + 62.81 \text{ for } \Delta H \text{ greater than zero and up to 130 J/g,}$$

$$\Delta T \geq 48° \text{ C. for } \Delta H \text{ greater than 130 J/g,}$$

wherein the CRYSTAF peak is determined using at least 5 percent of the cumulative polymer, and if less than 5 percent of the polymer has an identifiable CRYSTAF peak, then the CRYSTAF temperature is 30° C.; or
(c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$$Re > 1481 - 1629(d); \text{ or}$$

(d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
(e) has a storage modulus at 25° C., G'(25° C.), and a storage modulus at 100° C., G'(100° C.), wherein the ratio of G'(25° C.) to G'(100° C.) is in the range of about 1:1 to about 9:1.

Substantially linear ethylene polymer elastomers are commercially available, for instance from The Dow Chemical Company under the trade designation Affinity™ EG8200. The olefin block copolymers can be prepared by means within the skill in the art such as disclosed in WO2005/090427 and US2006/0199930 (U.S. application Ser. No. 11/376,835 filed Mar. 15, 2006) which are incorporated by reference to the fullest extent permitted by law. Preferred elastomers have a melting point, determined by Differential Scanning Calorimetry (DSC), of preferably at least about 55° C., more preferably at least about 58° C., most preferably at least about 60° C. The melting point of each elastomer in the adhesive film is preferably at most about 130° C., more preferably at most about 125° C., and most preferably at most about 122° C. The melt index as determined by the procedures of ASTM D1238, condition 190° C./2.16 Kg, is preferably at least about 2, more preferably at least about 2.5 most preferably at least about 3 and advantageously at most about 30, preferably at most about 25, more preferably at most about 20, most preferably at most about 15 dg/min.

The elastomer is present in an amount of preferably at least about 15, more preferably at least about 17, most preferably at least about 18 and preferably at most about 30, more preferably at most about 28, most preferably at most about 26 weight percent based on total weight of polymers in the film composition.

The film composition additionally optionally comprises additives within the skill in the art such as processing aids, pigments, low density nonlinear polyethylene (LDPE), or plasticizers. Those skilled in the art will also recognize that polymer components as obtained commercially may also contain additives. Combined weight of additives is preferably at most about 15, more preferably at most about 13, most preferably at most about 12 of the total weight of the film composition containing them. When LDPE is used as an additive, its amount is preferably at most about 10 weight percent, more preferably at most about 8, most preferably at most about 6 weight percent based on the weight of the film composition including additives.

The three components of the film compositions of the invention are suitably mixed by any means within the skill in the art, for instance single screw extrusion, twin screw extrusion, or melt blending. Mixing may occur at the time of film formation, for instance, by feeding polymers in comminuted form to an extruder in preparation for film formation. A process of preparing a film composition generally comprises steps of (a) supplying at least one first component, a maleic anhydride graft olefin polymer, (b) supplying a second component, at least one HDPE, (c) supplying third component, at least one elastomer, which preferably has a tensile elongation at break of at least about 585%, a density of at most about 0.900 g/cm³ or a combination thereof; and, (d) admixing the first, second and third components and optional additives.

Films of the invention are suitably formed by any means within the skill in the art, including blown and cast film forming methods. Casting films is preferred because embossing is easier with a cast process, and an embossed pattern helps to remove air during lamination. Exemplary methods include those within the skill in the art as disclosed, for instance, by *The Dynisco Extrusion Processor Handbook*, Written by Tony Whelan and David Dunning, 1$^{st}$ Ed 1996. A process of preparing a film preferably comprises steps of (a) supplying a first component, at least one maleic anhydride graft olefin polymer, (b) supplying a second component, at least one HDPE, (c) supplying third component, at least one elastomer, which preferably has a tensile elongation at break of at least about 585%, a density of at most about 0.900 g/cm³ or a combination thereof; (d) admixing the first, second and third components and optional additives; and, (e) casting the resulting admixture into a film.

Preferably a film of the invention has a thickness of at least about 0.038, more preferably at least about 0.051, most preferably at least about 0.064 and preferably at most about 0.127, more preferably at most about 0.102, most preferably at most about 0.076 mm.

At a thickness of about 0.064 mm, a film of the invention has a stress at yield MD of preferably at least about 10, more preferably at least about 11, most preferably at least about 12 and preferably at most about 20, more preferably at most about 19, most preferably at most about 18 MPa; a strain at yield MD of preferably at least about 10, more preferably at least about 9, most preferably at least about 8 and preferably at most about 20, more preferably at most about 19, most preferably at most about 18 MPa; a toughness MD of preferably at least about 90, more preferably at least about 92, most preferably at least about 93, and preferably at most about 160, more preferably at most about 155, most preferably at most about 153 MPa; a 1% secant modulus MD of preferably at least about 300, more preferably at least about 305, most preferably at least about 310, and preferably at most about 500, more preferably at most about 490, most preferably at most about 480 MPa; a melt flow rate of the composition before the film is formed of preferably at least about 1.5, more preferably at least about 2, most preferably at least about 2.5 and preferably at most about 30, more preferably at most about 25, most preferably at most about 15 dg/min; a DSC peak of the composition before the film is formed at preferably at least about 125, more preferably at least about 126, most preferably at least about 127 and preferably at most about 135, more preferably at most about 134, most preferably at most about 133° C.; or preferably a combination thereof, with combinations of more of these properties being more preferred than combinations of less of them.

A film of the invention is preferably laminated to at least one foam. The foam is advantageously a polymer foam, preferably a polyolefin foam, more preferably a foam made of ethylene or propylene polymer or a combination thereof, more preferably ethylene, most preferably a foam made using high density polyethylene. The foam is suitably in any form that does not prevent lamination, but is preferably a sheet such as an insulating sheet. Preferably the foam sheet has a thickness of at least about 4, more preferably at least about 5, most preferably at least about 6 and preferably at most about 10, more preferably at most about 9, most preferably at most about 8 mm.

Alternatively or additionally, films of the invention are preferably laminated to at least one metal. The metal is optionally in any form, but is preferably in sheet form. The sheet is optionally textured or shaped, for instance with ribs or similar contours as is within the state of the art for metal sheet such as metal sheet used to make metal buildings. Preferably the metal, when in sheet form, has a thickness of at least about 0.1, more preferably at least about 0.2, most preferably at least about 0.3 and preferably at most about 1.5, more preferably at most about 1.2, most preferably at most about 1.0 mm. Any metal is suitably laminated to the films of the invention. Preferred metals include, iron, steel, or aluminum. The metals are optionally primed, for instance, with polyester, or epoxy coatings, on the side adjacent the film of the invention and optionally on the side opposite the film.

In a preferred embodiment the invention is a laminate of a film of the invention between a metal substrate Contiguous to one side thereof and a polymer foam contiguous to the other side thereof. Such laminates are suitably formed by any method within the skill in the art, for instance hot roll lamination, hot press lamination, or heating in an autoclave. A process of making a laminate typically comprises steps of (a) supplying a film comprising at least one maleic anhydride grafted polyethylene, at least one HDPE and at least one elastomer, which preferably has a tensile elongation at break of at least about 585%, a density of at most about 0.900 g/cm³ or a combination thereof; (b) positioning a layer of the film directly adjacent to at least one layer metal on one side and directly adjacent to a polymer foam on the other (b) applying sufficient heat or other energy to result in softening of the film with simultaneous application of sufficient pressure to press polymer into intimate contact with metal and foam.

A laminate of a film of the invention directly adjacent to a metal sheet of primed steel on one side of the film and a foam sheet of high density polyethylene directly adjacent to the other has a peel strength at maximum load of preferably at least about 450, more preferably at least about 460, most preferably at least about 470, and preferably at most about 1000, more preferably at most about 900, most preferably at most about 800 N, a peel strength at average load of preferably at least about 400, more preferably at least about 410, most preferably at least about 420, and preferably at most about 900, more preferably at most about 800, most preferably at most about 700 N; a hanging weight failure temperature of preferably at least about 135, more preferably at least about 137, most preferably at least about 140° C.

Objects and advantages of this invention are further illustrated by the following examples. The particular materials and amounts thereof, as well as other conditions and details, recited in these examples should not be used to limit this invention. Unless stated otherwise all percentages, parts and ratios are by weight. Examples of the invention are numbered while comparative samples, which are not examples of the invention, are designated alphabetically.

Examples 1-7 and Comparative Samples A-E

The following materials are used:

| | |
|---|---|
| MGH-1 | a Maleic Anhydride Modified HDPE (MAH g HDPE) having a density of 0.965 and a melt index of 2 dg/min determined at (190° C., 2.16 kg) commercially available from The Dow Chemical Company under the trade designation AMPLIFY ™ GR-205 resin; |
| MGH-2 | a MAH g HDPE having a density of 0.943 and a melt index of 6 dg/min determined at (190° C., 2.16 kg) commercially available from Equistar Chemicals, LP under the trade designation PLEXAR ™ PX2220 resin; |
| MGL-1 | a MAH g LLDPE having a density of 0.9215 and a melt index of 2.1 dg/min determined at (190° C., 2.16 kg) commercially available from The Dow Chemical Company under the trade designation AMPLIFY ™ GR-207 resin; |
| HDPE-1 | an HDPE having 2% secant modulus near 150,000 psi (1034 MPa) and a melt index of 6.75 dg/min determined at (190° C., 2.16 kg) commercially available from The Dow Chemical Company under the trade designation DMDA-8907 NT7 HDPE; |
| HDPE-2 | an HDPE having 2% secant modulus near 115,000 psi (793 MPa) and a melt index of 6.0 dg/min determined at (190° C., 2.16 kg) commercially available from Equistar Chemicals, LP under the trade designation ALATHON ™ 6060 HDPE; |
| HDPE-3 | an HDPE having 2% secant modulus near 100,000 psi (689 MPa) and a melt index of 3 dg/min determined at (190° C., 2.16 kg) commercially available from Equistar Chemicals, LP under the trade designation ALATHON ™ 6030 HDPE; |
| PP:1 | a random copolymer polypropylene having a melt index of 8 dg/min determined at (230° C., 2.16 kg) commercially available from The Dow Chemical Company under the trade designation DS6D21 polypropylene; |
| ELAST-1 | a substantially linear ethylene polymer having a 2% secant modulus near 9500 psi (64 MPa) and a melt index of 1 dg/min determined at (190° C., 2.16 kg), a tensile elongation at break of 570-580%, and a density of 0.906 g/cm³, commercially available from The Dow Chemical Company under the trade designation AFFINITY ™ PL1880G |
| ELAST-2 | a substantially linear ethylene polymer having a 2% secant modulus near 3000 psi (20 MPa) and a melt index of 5 dg/min determined at (190° C., 2.16 kg), a tensile elongation at break of 1000%, and a density of 0.870 g/cm³, commercially available from The Dow Chemical Company under the trade designation AFFINITY ™ EG8200 |
| ADD-1 | a lubricant of 60 weight percent polyisobutylene in polyethylene commercially available from Ampacet, Inc. under the trade designation AMPACET ™ 102495; |
| ADD-2 | a processing aid believed to be a fluoroelastomer in LLDPE commercially available from Ampacet, Inc. under the trade designation AMPACET ™ 102113. |
| ELAST-3 | an olefin block copolymer of ethylene and octene having a density of 0.866 g/cm³ and a melt index of 5 dg/min determined at (190° C., 2.16 kg), a tensile elongation at break of 1300%, prepared by the procedure disclosed in WO2005/090427 and US2006/0199930 (U.S. application Ser. No. 11/376,835 filed March 15, 2006) wherein the catalysts are: Cat A1 is Catalyst (A1), [N-(2,6-di(1-methylethyl) phenyl)amido)(2-isopropylphenyl)(α-naphthalen-2-diyl (6-pyridin-2-diyl)methane]hafnium dimethyl, prepared according to the teachings of WO 03/40195, 2003US0204017, USSN 10/429,024, filed May 2, 2003, and WO 04/24740. Cat A2 is Catalyst (A2), bis-(1-(2-methylcyclohexyethyl)ethyl)(2-oxoyl-3,5-di(t-butyl)phenyl)immino) zirconium dibenzyl prepared according to the teachings in WO 2005/090427. DEZ is diethyl zinc. Cocatalysts (Cocat |

-continued are mixed $C_{14-18}$ alkyldimethylammonium salt of bis(tris(pentafluorophenyl)-alumane)-2-undecylimidazolide, prepared according to U.S. Pat. No. 6,395,671, Ex. 16.

The Process Conditions are:

| $C_8H_{16}$ kg/hr | 63.19 | Cat A2[3] ppm | 100 | $[C_2H_4]/[DEZ]$[4] | 1149 |
|---|---|---|---|---|---|
| Solv. kg/hr | 50.58 | A2 Flow kg/hr | 0.581 | Poly Rate[5] kg/hr | 104 |
| $H_2$ sccm[1] | 442.7 | DEZ Conc (ppm Zn) | 2700 | Conv %[6] | 90.6 |
| T ° C. | 120 | DEZ Flow kg/hr | 0.803 | Solids % | 17.3 |
| Cat A1[2] ppm | 600 | Cocat Conc. ppm | 8000 | Eff.[7] | 206 |
| Cat A1 Flow kg/hr | 0.807 | Cocat Flow kg/hr | 0.327 | | |

\* Comparative, not an example of the invention
[1] standard cm3/min
[2] [N-(2,6-di(1-methylethyl)phenyl)amido)(2-isopropylphenyl)(α-naphthalen-2-diyl(6-pyridin-2-diyl)methane)]hafnium dimethyl
[3] bis-(1-(2-methylcyclohexyl)ethyl)(2-oxoyl-3,5-di(t-butyl)phenyl)immino) zirconium dibenzyl
[4] molar ratio in reactor
[5] polymer production rate
[6] percent ethylene conversion in reactor
[7] efficiency, kg polymer/g M where g M = g Hf + g Zr And the Polymer Physical Properties are:

| Density (g/cm³) | 0.866 | Mw (g/mol) | 86600 | $T_m$ (° C.) | 120 |
|---|---|---|---|---|---|
| $I_2$ | 5 | Mn (g/mol) | 37200 | $T_c$ (° C.) | 99 |
| $I_{10}$ | 36.7 | Mw/Mn | 2.3 | $T_{CRYSTAF}$ (° C.) | |
| $I_{10}/I_2$ | 7.3 | Heat of Fusion (J/g) | 24 | Tm − $T_{CRYSTAF}$ (° C.) CRYSTAF Peak Area (percent) | |

Method for Making Blends and Compositions Used in the Examples of the Invention and Competitive Samples:

In making blends comprising blends of MAH grafted ethylene polymer, HDPE or propylene polymer and elastomer, pellets of each polymer are weighed on a scale are placed in a large plastic bag and mixed well by tumbling and shaking the bag.

In Each Example and Comparative Sample the Formulation indicated in Table 1 is Made into a Film by the Following Procedure:

The mixed pellets are processed into films using a laboratory scale cast film line consisting of a Killion Model KL-100 extruder commercially available from Davis-Standard, LLC. The extruder has a screw with a diameter of 25.4 mm and a relative screw length of 24 times the diameter. The barrel of the film extruder is divided into three heating zones progressively increasing the temperature of the polymer material up to the clamp ring, adapter, feedblock, and the three heating zones in the flat die. The barrel temperature is maintained in each of three zones near temperatures of 166° C., 166° C., and 168° C. The damp ring, adapter; feedblock are all maintained at 168° C. The temperatures are varied in each zone in a relatively narrow range according to the melt flow rate of the resin used. The speed of the screw is maintained at between 70 and 75 rpm for the 64 μm thick films. The extruder is equipped with a 254 mm wide extrusion die having a die gap of 1.0 mm. The temperature of the die is maintained at 171° C. in the middle sections, both edges and at the lips of the die. Films having a thicknesses 2.5 mil (64 μm) are produced from each formulation at a width of 178 mm. Each film is extruded and cooled using the cast film unit and is wound onto a 4 cm core. Film samples are cut for testing from each film produced.

A Laminate is Prepared from Each Film by the Following Procedure:

A commercially available primed steel flat metal sheet having a thickness of 0.38 mm, commercially available from sources such as ACT Laboratories, Wixom, Mich., USA is placed on one side of the film. On the other side, a foamed high density polyethylene foam sheet having a thickness of 7.1 mm and a density of at most 0.80 g/cm³ made by extruding a high density polyethylene resin having a melt index of 1.0 dg/min (at 190° C/2.16 kg) using sufficient blowing agent of citric acid/sodium bicarbonate to reach the desired final density is used. These layers are laminated by layering them together into a stack consisting of a metal sheet, adhesive film, HDPE foam core, adhesive film, and metal sheet and placing this assembly between release coated glass fabric sheets and placed inside a window frame type mold where the resulting assembly is exposed to 200° C. at for a period of 4 minutes under pressure of 70,000 kPa on the window frame mold.

Composition and Film Testing Procedures

A DSC trace of heat flow v. temperature is obtained for the composition from which a film is to be made after the composition is heated to 200° C. over a period of 17 minutes at a rate of 10° C./minute, cooling to 25° C. over a period of 17 minutes at a rate of 10° C./minute, and reheating to 200° C. at a rate of 10° C./min. In most instances, one large, very broad melting peak is observed and the temperature corresponding to the highest point is recorded. In the case of more than one peak, the temperature corresponding to the highest is recorded. The film is tested for tensile toughness, 1% secant-modulus, stress and strain at yield, all in the machine direction, according to the procedures of ASTM-D822. The composition before film formation is tested for melt flow rate according to the procedures of ASTM-D1238 at 190° C., 2.16 kg. These results are reported in Table 1.

In addition the laminate is tested to determine peel strength at maximum and average load and the hanging weight failure, all as previously defined.

TABLE 1

COMPONENTS IN EACH EXAMPLE AND COMPARATIVE SAMPLE AND TEST RESULTS

| Component/Physical Property | Direction | Units | Test Method | CS A | CS B | CS C | CS D | CS E | EX 1 | EX 2 | EX 3 | EX 4 | EX 5 | EX 6 | EX 7 |
|---|---|---|---|---|---|---|---|---|---|---|---|---|---|---|---|
| MGH-1 | | | | 35 | 40 | 35 | 30 | 30 | | 30 | 30 | 30 | 30 | 30 | 30 |
| MGH-2 | | | | | | | | | 30 | | | | | | |
| MGL-1 | | | | 35 | 10 | 25 | | | | | | | | | |
| HDPE-1 | | | | 30 | | 30 | 50 | | 50 | 50 | 50 | | | | |
| HDPE-2 | | | | | | | | 60 | | | | | 50 | | 50 |
| HDPE-3 | | | | | | | | | | | | 40 | | 50 | |
| PP-1 | | | | | 50 | | | | | | | | | | |
| ELAST-1 | | | | | | | 20 | | | | | | | | |
| ELAST-2 | | | | | | | | 10 | 20 | | 20 | 30 | 20 | 20 | 10 |
| ELAST-3 | | | | | | | | | | | 20 | | | | 10 |
| ADD-1 | | | | | | | 7 | | | | | | | | |
| ADD-2 | | | | | | | 3 | | | | | | | | |
| Stress at Yield | MD | MPa | ASTM D882 | 13 | 19 | 14 | 16 | 19 | 12 | 15 | 14 | 12 | 14 | 15 | 16 |
| Strain at Yield | MD | % | ASTM D882 | 11 | 8 | 21 | 13 | 11 | 14 | 10 | 11 | 15 | 12 | 12 | 12 |
| Toughness | MD | MPa | ASTM D882 | 84 | 110 | 69 | 11 | 134 | 94 | 107 | 117 | 129 | 95 | 120 | 130 |
| 1% Secant Modulus | MD | MPa | ASTM D882 | 340 | 590 | 380 | 510 | 530 | 400 | 400 | 370 | 310 | 470 | 380 | 420 |
| Melt Flow Rate | — | decigrams/min | ASTM D1238 (190 C./2.16 Kg) | 2.8 | 2.4 | 0.5 | 3 | 4.8 | 6 | 5 | 5.2 | 4.6 | 4.6 | 3.1 | 4.5 |
| DSC Peak, 1st scan | — | ° C. | heat/cool 10° C./min | 128 | 128 | 130 | 130 | 130 | 129 | 130 | 130 | 130 | 130 | 130 | 130 |
| #1 Peel Strength, Max load | — | N | 10"/min rate, 4" jaw gap, 1" wide sample | 129 | 85 | 173 | 205 | 191 | 667 | 667 | 534 | 676 | 832 | 703 | 711 |
| #1 Peel Strength, Avg Load | — | N | same | 76 | 67 | 98 | 89 | 80 | 592 | 489 | 489 | 583 | 605 | 507 | 538 |
| Hanging Weight Failure Temperature | — | ° C. | 0.45 kg weight laminate 90 degree L peel | 140 | 140 | 140 | 140 | 140 | 140 | 140 | 140 | 140 | 140 | 140 | 140 |

*CS = Comparative Sample, not an example of the invention

The data in Table 1 shows that films made from a composition comprising at least 50 wt % of at least one HDPE, at least 20 wt % of at least one Elastomer having a tensile elongation at break of at least about 585% and a density of at least about 0.900 g/cm³, and at least 30 wt % of at least one maleic anhydride HDPE gave acceptable adheion (peel strength at average or peak load, preferably both, greater than 400 N) in the laminate form. The comparative samples which were of other compositions failed the adhesion test.

Embodiments of the invention include the following:
1. A film, useful as an adhesive layer in a laminate, that is an adhesive film, comprising (a) at least one anhydride grafted polyolefin, (b) at least one HDPE, and (c) at least one elastomer, which preferably has a tensile elongation at break of at least about 585%, a density of at most about 0.900 g/cm³ or a combination thereof.
2. A composition, useful in forming an adhesive layer for a laminate comprising (a) at least one anhydride grafted polyolefin, (b) at least one HDPE, and (c) at least one elastomer, which preferably has a tensile elongation at break of at least about 585%, a density of at most about 0.900 g/cm³ or a combination thereof.
3. A laminate comprising the film of embodiment 1 and at least one substrate, said substrate preferably metal, foam or combination thereof, each independently preferably directly adjacent to the film, more preferably comprising at least one metal substrate on one side of the film and at least one foam substrate on the opposite side of the film; optionally comprising at least two layers of film of embodiment 1 (hereinafter layer of adhesive film), optionally of the same or different composition, preferably having at least one metal substrate adjacent each layer of adhesive film and at least one layer of foam between the adhesive layers; preferably in all instances, the adhesive film is directly adjacent to the metal or foam substrate or, more preferably both.
4. The laminate of embodiment 3 wherein the laminate includes at least one metal which is selected from iron, steel, aluminum or a combination thereof, and is optionally and preferably painted, coated or primed, more preferably with a composition comprising at least one polyester coating, at least one epoxy coating or a combination thereof, preferably on the side of the metal directly adjacent the film of the invention and optionally on the side opposite the film.
5. The laminate of embodiment 3 or 4 wherein the laminate includes at least one metal is in sheet form and has a thickness of at least about any of 0.1, 0.2, or 0.3 preferably to at most about any of 1.5, 1.2, 1.0 mm.
6. A laminate of embodiment 3 or 4 wherein the laminate includes at least one foam substrate, which is advantageously a polymer foam, preferably wherein the polymer comprises at least one polyolefin, more preferably at least one ethylene polymer, most at least one HDPE.
7. The laminate of embodiment 5 wherein the foam is directly adjacent the film on the side of the film opposite that of the metal substrate.
8. An article comprising at least one composition of embodiment 2, film of embodiment 1, laminate of any of embodiments 3 through 7 or a combination thereof.
9. The laminate, article, film or composition of any of the preceding embodiments wherein the polymer composition is at least about any of 85, 90, or 95 weight percent of the composition, film or interlayer film of the laminate or article, the remainder comprising at least one additive.

10. The laminate, article, film or composition of any of the preceding embodiments wherein at least one, preferably each anhydride grafted polyolefin polymer, independently, is selected from a maleic anhydride (MAH) grafted polyolefin, a MAH grafted polyethylene, or combination thereof, and preferably is a MAH grafted HDPE (MAH g HDPE).

11. The laminate, article, film or composition of any of the preceding embodiments wherein at least one, preferably each anhydride grafted polyolefin polymer independently has at least 1, preferably 2, more preferably 3 of the following:
    (a) a melting point, determined by Differential Scanning Calorimetry (DSC), of at least about any of 125, 128, or 130° C., preferably to about any of 135, 134 or 133° C.;
    (b) a melt index as determined by the procedures of ASTM D1238, condition 190° C./2.16 Kg, of at least about any of 2, 2.5, 3 to preferably at most about any of 30, 25, 20, or 15 dg/min; or
    (c) a graft content preferably of at least about 0.5, 0.75 or 1 preferably to at most about any of 3, 2.8, 2.5, or 2 percent by weight.

12. The laminate, article, film or composition of any of the preceding embodiments wherein at least one, preferably each, HDPE independently has at least one, preferably 2 of (a) a melting point, determined by Differential Scanning Calorimetry (DSC), of preferably at least about 125, 127, 129° C., preferably to at most about any of 135, 134, or 133° C.; or (b) a melt index as determined by the procedures of ASTM D1238, condition 190° C./2.16 kg, at least about any of 2, 2.5, or 3 and advantageously at most about any of 30, 25, 20, or 15 dg/min.

13. The laminate, article, film or composition of any of the preceding embodiments wherein at least one, preferably each, elastomer independently is selected from a substantially linear ethylene polymer or an olefin block copolymer, or combination thereof.

14. The laminate, article, film or composition of any of the preceding embodiments wherein at least one, preferably each, elastomer independently comprises an olefin block copolymer that
    (a) has a Mw/Mn from about 1.7 to about 3.5, at least one melting point, Tm, in degrees Celsius, and a density, d, in grams/cubic centimeter, wherein the numerical values of Tm and d correspond to the relationship:

$Tm > -2002.9 + 4538.5(d) - 2422.2(d)2$; or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for ΔH greater than zero and up to 130 J/g, $\Delta T \geq 48°$ C. for ΔH greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or
    (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d)$; or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
    (e) has a storage modulus at 25° C., G'(25° C.), and a storage modulus at 100° C., G'(100° C.), wherein the ratio of G'(25° C.) to G'(100° C.) is in the range of about 1:1 to about 9:1.

15. The laminate, article, film or composition of any of the preceding embodiments wherein at least one, preferably each, elastomer independently has at least 1, preferably 2, more preferably 3, most preferably 4 of
    (a) a tensile elongation at break of advantageously at least about any of 585, 600, 700, 750, 800, 900, and preferably to at most about any of 2000, 1700, 1500 percent as measured by the procedures of D-882;
    (b) a density as determined by the procedures of ASTM D-2839 of at most about any of 0.900, 0.895, 0.890, or 0.885 g/cm$^3$;
    (c) a melting point, determined by Differential Scanning Calorimetry (DSC), of at least about any of 55, 58 or 60° C., preferably to at most about any of 130, 125, or 122° C.; or
    (d) a melt index as determined by the procedures of ASTM D1238, condition 190° C./2.16 Kg, at least about any of 2, 2.5, or 3, advantageously to at most about any of 30, 25, 20, or 15 dg/min.

16. The laminate, article, film or composition of any of the preceding embodiments wherein anhydride grafted polyolefin polymer or combination thereof comprises from at least about any of 20, 24, or 28 to at most about any of 32, 36, or 40 weight percent of the polymers in the composition or film; the HDPE or combination thereof comprises from at least about any of 40, 44, or 46 to at most about any of 54, 56, or 60 weight percent of the polymers in the composition or film; and the elastomer or combination thereof comprises from at least about any of 15, 17, or 18 to at most about any of 26, 28, or 30 weight percent of the polymers in the composition or film.

17. The laminate, article, film or composition of any of the preceding embodiments wherein the film is of a composition that, preferably at a thickness of about 0.064 mm, has advantageously at least 1, more advantageously at least 2, most advantageously at least 3, preferably at least 4, more preferably at least 5, most preferably at least 6 of the following:
    (a) a stress at yield MD of at least about any of 10, 11, 12 preferably to at most about any of 20, 19, or 18 MPa;
    (b) a strain at yield MD of at least about any of 10, 9, 8 preferably to at most about any of 20, 19, 18 MPa;
    (c) a toughness MD of at least about any of 90, 92, or 93, preferably to at most about any of 160, 155, or 153 MPa;
    (d) a 1% secant modulus MD of at least about any of 300, 305, or 310, preferably to at most about any of 500, 490, 480 MPa;
    (e) a melt flow rate of at least about any of 1.5, 2, 2.5 preferably to at most about any of 30, 25, 15 dg/min; or (f) a DSC peak at at least about any of 125, 126, 127° C. preferably to at most about any of 135, 134, or 133° C.
18. The laminate, article, film or composition of any of the preceding embodiments wherein the laminate or article or a laminate of the film, or of a film comprising the composition, has at least one, preferably at least 2, more preferably at least 3, most preferably 4 of the following:
  (a) a peel strength at maximum load of preferably at least about any of 450, 460, or 470, preferably to at most about any of 1000, 900, or 800 N;
  (b) a peel strength at average load of at least about any of 400, 410, or 420, preferably to at most about any of 900, 800, or 700 N;
  (c) a hanging failure temperature of at least about any of 130, 135, 140, 145, 150, 155, or 160° C.
  (d) a hanging weight failure temperature of at least about any of 130, 135, 137, or 140° C.
19. A process of preparing a film composition of any of the preceding embodiments comprising steps of (a) supplying a first component, a maleic anhydride graft olefin polymer, (b) supplying a second component, at least one HDPE, (c) supplying third component, at least one elastomer; and, (d) admixing the first, second and third components and optional additives.
20. A process of preparing a film of any of the preceding embodiments comprising steps of (a) supplying a first component, at least one maleic anhydride graft olefin polymer, (b) supplying a second component, at least one HDPE, (c) supplying third component, at least one elastomer; (d) admixing the first, second and third components and optional additives; and, (e) casting the resulting admixture into a film.
21. A process of making a laminate of any of the preceding embodiments comprising steps of (a) supplying a film of any of the preceding embodiments; (b) positioning a layer of the film directly adjacent to at least one first substrate on one side and directly adjacent to second substrate on the other (b) applying sufficient heat or other energy to result in softening of the film with simultaneous application of sufficient pressure to press polymer into intimate contact with the first and second substrates.
22. The process of embodiment 21 wherein there is an additional step (c) of cooling the resulting laminate to ambient temperature.
23. The process of any preceding embodiment wherein the first substrate is metal, preferably a metal sheet; the second substrate is foam, preferably a foam sheet; or, preferably, both.
24. The process of any of the preceding embodiments in which the elastomer has a tensile elongation at break of at least about 585%, a density of at most about 0.900 g/cm³ or, preferably, a combination thereof.
25. The laminate, article, film process or composition of any of the preceding embodiments wherein the film has a thickness of at least about any of 0.038, 0.051, or 0.064 mm, preferably to at most about any of 0.127, 0.102, or 0.076 mm.

The invention claimed is:
1. An adhesive film comprising (a) from 20 to 40 weight percent of at least one anhydride grafted polyolefin, (b) from 40 to 60 weight percent of at least one HDPE having a density of from about 0.950 to about to about 0.965 g/cm³ and (c) from 15 to 30 weight percent of at least one elastomer having a combination of a tensile elongation at break of at least about 585% as determined by the procedures of ASTM D822, and a density of at most about 0.900 g/cm³, wherein the elastomer is a substantially linear ethylene polymer or olefin block copolymer or combination thereof, together the anhydride grafted polyolefin, HDPE and elastomer or combination of each are at least 85 weight percent of the film, and the weight percentages are based on the weight of the polymers in the film.
2. The film of claim 1 wherein each anhydride grafted polyolefin is a MAH-g-HDPE.
3. The film of claim 1 wherein the olefin block copolymer:
  (a) has a Mw/Mn from about 1.7 to about 3.5, at least one melting point, Tm, in degrees Celsius, and a density, d, in grams/cubic centimeter, wherein the numerical values of Tm and d correspond to the relationship:

$Tm > -2002.9 + 4538.5(d) - 2422.2(d)2;$ or (b) has a Mw/Mn from about 1.7 to about 3.5, and is characterized by a heat of fusion, ΔH in J/g, and a delta quantity, ΔT, in degrees Celsius defined as the temperature difference between the tallest DSC peak and the tallest CRYSTAF peak, wherein the numerical values of ΔT and ΔH have the following relationships:

$\Delta T > -0.1299(\Delta H) + 62.81$ for $\Delta H$ greater than zero and up to 130 J/g, $\Delta T \geq 48°$ C. for $\Delta H$ greater than 130 J/g, wherein the CRYSTAF peak is determined using at least 5 percent of the cumulative polymer, and if less than 5 percent of the polymer has an identifiable CRYSTAF peak, then the CRYSTAF temperature is 30° C.; or
  (c) is characterized by an elastic recovery, Re, in percent at 300 percent strain and 1 cycle measured with a compression-molded film of the ethylene/α-olefin interpolymer, and has a density, d, in grams/cubic centimeter, wherein the numerical values of Re and d satisfy the following relationship when ethylene/α-olefin interpolymer is substantially free of a cross-linked phase:

$Re > 1481 - 1629(d);$ or (d) has a molecular fraction which elutes between 40° C. and 130° C. when fractionated using TREF, characterized in that the fraction has a molar comonomer content of at least 5 percent higher than that of a comparable random ethylene interpolymer fraction eluting between the same temperatures, wherein said comparable random ethylene interpolymer has the same comonomer(s) and has a melt index, density, and molar comonomer content (based on the whole polymer) within 10 percent of that of the ethylene/α-olefin interpolymer; or
  (e) has a storage modulus at 25° C., G'(25° C.), and a storage modulus at 100° C., G'(100° C.), wherein the ratio of G'(25° C.) to G'(100° C.) is in the range of about 1:1 to about 9:1.
4. The film of claim 1 wherein at least one anhydride grafted polyolefin polymer has at least 1 of the following:
  (a) a melting point, determined by Differential Scanning Calorimetry (DSC), of 125 ° C. to 135° C.;
  (b) a melt index as determined by the procedures of ASTM D1238, condition 190 ° C./2.16 Kg, of 2 to 30 dg/min; or
  (c) a graft content of 0.5 to 3 percent by weight.
5. The film of claim 1 wherein at least one HDPE has at least one of (a) a melting point, determined by Differential Scanning Calorimetry (DSC), of 125° C. to 135° C.; or (b) a melt index as determined by the procedures of ASTM D1238, condition 190° C./2.16 kg, of 2 to 30 dg/min.
6. The film of claim 1 wherein at least one elastomer has at least 1 of
  (a) a tensile elongation at break of 200 to 2000 percent as measured by the procedures of D-882;

(b) a melting point, determined by Differential Scanning Calorimetry (DSC), of 55° C., to 130° C.; or
(c) a melt index as determined by the procedures of ASTM D1238, condition 190° C./2.16 Kg, 2 to 30 dg/min.

7. The film of claim 1 wherein the film is of a composition that at a thickness of about 0.0645 mm would have at least 1 of the following:
  (a) a stress at yield MD of 10 to 20 MPa;
  (b) a strain at yield MD of 10 to 20 MPa;
  (c) a toughness MD of 90 to 160 MPa;
  (d) a 1% secant modulus MD of 300 to 500 MPa;
  (e) a melt flow rate of 1.5 to 30 dg/min; or (f) a DSC peak between 125 and 135° C.

8. A laminate comprising the film of claim 1 and at least one substrate selected from a metal or a foam or a combination thereof.

9. The laminate of claim 8 wherein the laminate has at least one of the following:
  (a) a peel strength at maximum load of 450 to 1000 N;
  (b) a peel strength at average load of 400 to 900 N;
  (c) a hanging weight failure temperature of at least about 130° C.

10. A process of preparing an adhesive film composition comprising steps of (a) supplying a first component, from 20 to 40 weight percent of at least one anhydride graft olefin polymer, (b) supplying a second component, from 40 to 60 weight percent of at least one HDPE having a density of from about 0.950 to about to about 0.965 g/cm$^3$, (c) supplying third component, from 15 to 30 weight percent of at least one elastomer having a combination of a tensile elongation at break of at least about 585% as determined by the procedures of ASTM D822, and a density of at most about 0.900 g/cm$^3$, wherein the elastomer is a substantially linear ethylene polymer or olefin block copolymer or combination thereof; and, (d) admixing the first, second and third components and optional additives; wherein together the anhydride grafted polyolefin, HDPE and elastomer or combination of each are at least 85 weight percent of the film, and the weight percentages are based on the weight of the polymers in the film.

11. A process of preparing an adhesive film comprising steps of (a) supplying a first component, from 20 to 40 weight percent of at least one anhydride graft olefin polymer, (b) supplying a second component, from 40 to 60 weight percent of at least one HDPE having a density of from about 0.950 to about to about 0.965 g/cm$^3$, (c) supplying third component, from 15 to 30 weight percent of at least one elastomer having a combination of a tensile elongation at break of at least about 585% as determined by the procedures of ASTM D822, and a density of at most about 0.900 g/cm$^3$; and, wherein the elastomer is a substantially linear ethylene polymer or olefin block copolymer or combination thereof; (d) admixing the first, second and third components and optional additives; and, (e) casting the resulting admixture into a film wherein together the anhydride grafted polyolefin, HDPE and elastomer or combination of each are at least 85 weight percent of the film, and the weight percentages are based on the weight of the polymers in the film.

12. A process of making a laminate comprising steps of (a) supplying a film according to claim 1; (b) positioning a layer of the film directly adjacent to at least one layer metal on one side and directly adjacent to a polymer foam on the other (b) applying sufficient heat or other energy to result in softening of the film with simultaneous application of sufficient pressure to press polymer into intimate contact with metal and foam.

13. The film of claim 3 wherein at least one anhydride grafted polyolefin polymer has at least 1 of the following:
  (a) a melting point, determined by Differential Scanning Calorimetry (DSC), of 125 ° C. to 135° C.;
  (b) a melt index as determined by the procedures of ASTM D1238, condition 190 ° C./2.16 Kg, of 2 to 30 dg/min; or
  (c) a graft content of 0.5 to 3 percent by weight.

14. The film of claim 3 wherein at least one HDPE has at least one of (a) a melting point, determined by Differential Scanning Calorimetry (DSC), of 125° C. to 135° C.; or (b) a melt index as determined by the procedures of ASTM D1238, condition 190° C./2.16 kg, of 2 to 30 dg/min.

15. A laminate comprising the film of claim 3 and at least one substrate selected from a metal or a foam or a combination thereof.

* * * * *